US 6,729,269 B2

(12) United States Patent
Ott et al.

(10) Patent No.: US 6,729,269 B2
(45) Date of Patent: May 4, 2004

(54) CARBON OR GRAPHITE FOAM AS A HEATING ELEMENT AND SYSTEM THEREOF

(75) Inventors: Ronald D. Ott, Knoxville, TN (US); April D. McMillan, Knoxville, TN (US); Ashok Choudhury, Oak Ridge, TN (US)

(73) Assignee: UT-Battelle, LLC, Oak Ridge, TN (US)

( * ) Notice: Subject to any disclaimer, the term of this patent is extended or adjusted under 35 U.S.C. 154(b) by 32 days.

(21) Appl. No.: 10/152,871

(22) Filed: May 21, 2002

(65) Prior Publication Data

US 2003/0000486 A1 Jan. 2, 2003

Related U.S. Application Data

(63) Continuation-in-part of application No. 09/458,640, filed on Dec. 9, 1999, now abandoned, which is a continuation-in-part of application No. 09/093,406, filed on Jun. 8, 1998, now Pat. No. 6,037,032, which is a continuation-in-part of application No. 08/923,877, filed on Sep. 2, 1997, now abandoned, and a continuation-in-part of application No. 08/921,875, filed on Sep. 2, 1997, now Pat. No. 6,033,506.

(51) Int. Cl.[7] .................................................. F01P 1/06
(52) U.S. Cl. ................................ 123/41.31; 123/41.72; 123/142.5 E
(58) Field of Search ....................... 123/41.31, 41.72, 123/142.5 E, 196 AB, 142.5 R; 62/3.5, 3.6, 3.62, 3.3, 3.7

(56) References Cited

U.S. PATENT DOCUMENTS

| 3,953,707 A | 4/1976 | Tanis |
| 3,970,816 A | * 7/1976 | Hosokawa et al. ......... 219/205 |
| 4,419,650 A | 12/1983 | John |
| 5,054,459 A | * 10/1991 | Reimer et al. .............. 123/549 |
| 5,970,927 A | 10/1999 | Suzuki |
| 6,033,506 A | 3/2000 | Klett |
| 6,037,032 A | 3/2000 | Klett et al. |
| 6,220,522 B1 | 4/2001 | Suzuki |
| 6,325,026 B1 | * 12/2001 | Suzuki ...................... 123/41.1 |
| 6,430,935 B1 | 8/2002 | Klett et al. |
| 6,438,964 B1 | 8/2002 | Giblin |

FOREIGN PATENT DOCUMENTS

WO    WO 99/11586    3/1999

OTHER PUBLICATIONS

G.D. Mahan, et al., "*Multilayer Thermionic Refrigeration*", The American Physical Society, vol. 80, No. 18, May, 1998, pp. 4016–4019.

J. Klett, "*High Thermal Conductivity, Mesophase Pitch–Derived Carbon Foam*", Proceedings fo the 43rd International SAMPE Symposium, May 31–Jun. 4, Anaheim, California, SAMPE, 1998.

* cited by examiner

Primary Examiner—Tony M. Argenbright
Assistant Examiner—Hyder Ali
(74) Attorney, Agent, or Firm—Akerman Senterfitt

(57) ABSTRACT

A temperature regulator includes at least one electrically conductive carbon foam element. The foam element includes at least two locations adapted for receiving electrical connectors thereto for heating a fluid, such as engine oil. A combustion engine includes an engine block and at least one carbon foam element, the foam element extending into the engine block or disposed in thermal contact with at least one engine fluid.

66 Claims, 2 Drawing Sheets

CARBON OR GRAPHITE FOAM AS A HEATING ELEMENT AND SYSTEM THEREOF

CROSS-REFERENCE TO RELATED APPLICATIONS

This application is a Continuation-In-Part of application Ser. No. 09/458,640 filed Dec. 9, 1999, which itself is a continuation-in-part of U.S. application Ser. No. 09/093,406 filed Jun. 8, 1998, now U.S. Pat. No. 6,037,032, which itself is a continuation-in-part of both U.S. application Ser. No. 08/923,877 filed Sep. 2, 1997, abandoned, and U.S. application Ser. No. 08/921,875 filed Sep. 2, 1997, now U.S. Pat. No. 6,033,506.

STATEMENT REGARDING FEDERALLY SPONSORED RESEARCH OF DEVELOPMENT

The United States Government has rights in this invention pursuant to Contract No. DE-AC05-000R22725 between the United States Department of Energy and UT-Battelle, LLC.

FIELD OF INVENTION

This invention relates to techniques and systems for controlling the temperature of fluids. More particularly, this invention relates to devices for controlling the temperature of fluids used with internal combustion engines.

BACKGROUND OF THE INVENTION

Thermal control of engine lubricating oil and other fluid temperatures can provide significant advantages. For example, it is generally helpful to preheat engine oil prior to startup to reduce engine wear during this period. Preheated engine oil can also reduce high emission levels that are generally produced at startup due to low initial engine operating temperatures.

In addition, under steady state conditions, it is desirable to limit lubricating oil temperatures as resulting lower peak engine temperatures are known to enhance the longevity of the oil and the various engine components. Lower peak oil temperature permits oil to perform its lubricating function more effectively.

Automotive engines are now generally required-to run hotter than in the past in order to meet the goals of improved fuel economy and lower emissions. With the incorporation of an oil cooler, oil temperatures can be reduced. This permits the lubricating oil and resulting engine operating temperature to be run at a lower, more optimal temperature level. In some cases for certain large vehicles, such as class 7–8 trucks, part of the water cooling system is used for oil cooling. However, these cooling systems can add significant weight, cost, and complexity to the vehicle.

Particularly for larger vehicles such as trucks, it is advantageous to maintain a lower, more consistent oil temperature because this allows the oil to better carry soot to the oil filter. Achieving improved oil stability permits the use of lighter weight oils, which are known to generally result in improved fuel economy.

Furthermore, when higher levels of exhaust gas recirculation (EGR) are introduced back into the engine for further combustion in order to reduce harmful emissions and increase gas mileage, the resulting oil temperature is estimated to increase approximately 20° F. EGR is also known to introduce more soot into oil, thus decreasing oil life by exacerbating oil breakdown. Oil breakdown allows soot to aggregate, producing larger particles which can lead to oil filtration problems. Thus, improved thermal management systems are needed for engine fluids, such as engine oil.

SUMMARY OF THE INVENTION

The present invention provides carbon foam based thermal regulators, systems and methods thereof. In a preferred embodiment, the thermal regulator is adapted to provide both heating and heat exchanging. The heating feature is helpful at engine startup, while the heat exchange feature can be used to reduce engine oil and overall engine operating temperatures.

A temperature regulator includes at least one carbon foam element, the foam element for electrically heating fluids. Two locations on the carbon foam element are adapted for receiving electrical connectors thereto. The carbon foam element can provide an electrical resistivity of between 1 to 500 $\mu$ohm·meter at 25° C. The carbon foam element can be used to heat liquids, such as oil, ethylene glycol, brake fluid, transmission fluid and power steering fluid.

In a preferred embominent, at least a portion of the carbon foam is thermally and electrically conductive. In this embodiment, the carbon foam element can be thermally connected to an active cooling device. The active cooling device can be a heat exchanger having a shell side and a tube side, wherein the shell side comprises the thermally conductive carbon foam element. The carbon foam element can comprise graphite foam and provide a thermal conductivity of at least 50 W/m·K.

The electrically conductive carbon foam element may be disposed in an oil container, and may include a flanged portion. A thermostat can be included for triggering heating of the carbon foam element when the temperature is below a predetermined minimum temperature and for terminating the heating when the temperature is at or above a predetermined maximum temperature.

In another embodiment, a combustion engine includes an engine block and at least one carbon foam element, the foam element extending into the engine block or disposed in thermal contact with at least one engine fluid. When the carbon foam element is disposed in the engine block, the carbon foam element can include at least two locations each adapted for receiving electrical connectors thereto. The carbon foam element can be used to provide passive cooling or active cooling. In the active cooling embodiment, the carbon foam element is thermally connected to the active cooling device, such as a heat exchanger having a shell side and a tube side, wherein the shell side comprises a graphite foam element, the graphite foam has a thermal conductivity of at least 50 W/m·K.

A method for controlling the temperature of fluids includes the steps of providing at least one electrically conductive carbon foam element, the electrically conductive foam element being thermally connected to a fluid, and heating the fluid by dissipating electrical current across the electrically conductive foam element. The heating can be initiated when the fluid is at a temperature below a first predetermined temperature, and terminate when the fluid is at a temperature above a predetermined maximum temperature. The method can also include the step of cooling the fluid after the fluid reaches a predetermined cooling temperature.

The fluid can include other states of matter associated therewith, such as particulates and semi-solid matter, such as states that can be present during injection molding or the pulling of fibers. The method can also include the step of controlling the viscosity of fluids.

A temperature regulation system includes a temperature regulator including at least one electrically conductive carbon foam element, the electrically conductive foam element for electrically heating fluids, and a structure for applying a potential difference across the electrically conductive carbon foam element. The electrically conductive carbon foam element can be adapted to heat fluids, such as oil, ethylene glycol, brake fluid, transmission fluid and power steering fluid. The electrically conductive carbon foam element can also provide cooling to fluids.

A method for operating a combustion engine includes the steps of providing at least one electrically conductive carbon foam element, the foam element thermally connected to an engine fluid, and at least one of heating the engine by dissipating electrical current across the electrically conductive carbon foam element when the engine is at a temperature below a predetermined minimum operating temperature and cooling the engine if the engine temperature is at or above a maximum operating temperature. The cooling comprises radiating heat through a thermally conductive carbon foam element. The heating can be terminated when the fluid heating step results in the temperature being above a predetermined shutoff temperature.

The thermally conductive carbon foam element can be graphite foam and can extend into the engine block. The graphite foam can provide a thermal conductivity of at least 50 W/m·K.

A heat spreader includes at least one thermally conductive carbon foam element, the carbon foam element adapted to be placed in thermal contact with a region to be cooled. The foam element draws heat from the region to be cooled and distributes the heat across its volume. The region for cooling can be included in a medical application, food process equipment or an engine.

BRIEF DESCRIPTION OF THE DRAWINGS

A fuller understanding of the present invention and the features and benefits thereof will be accomplished upon review of the following detailed description together with the accompanying drawings, in which.

DETAILED DESCRIPTION OF THE PREFERRED EMBODIMENTS

Figure 1:
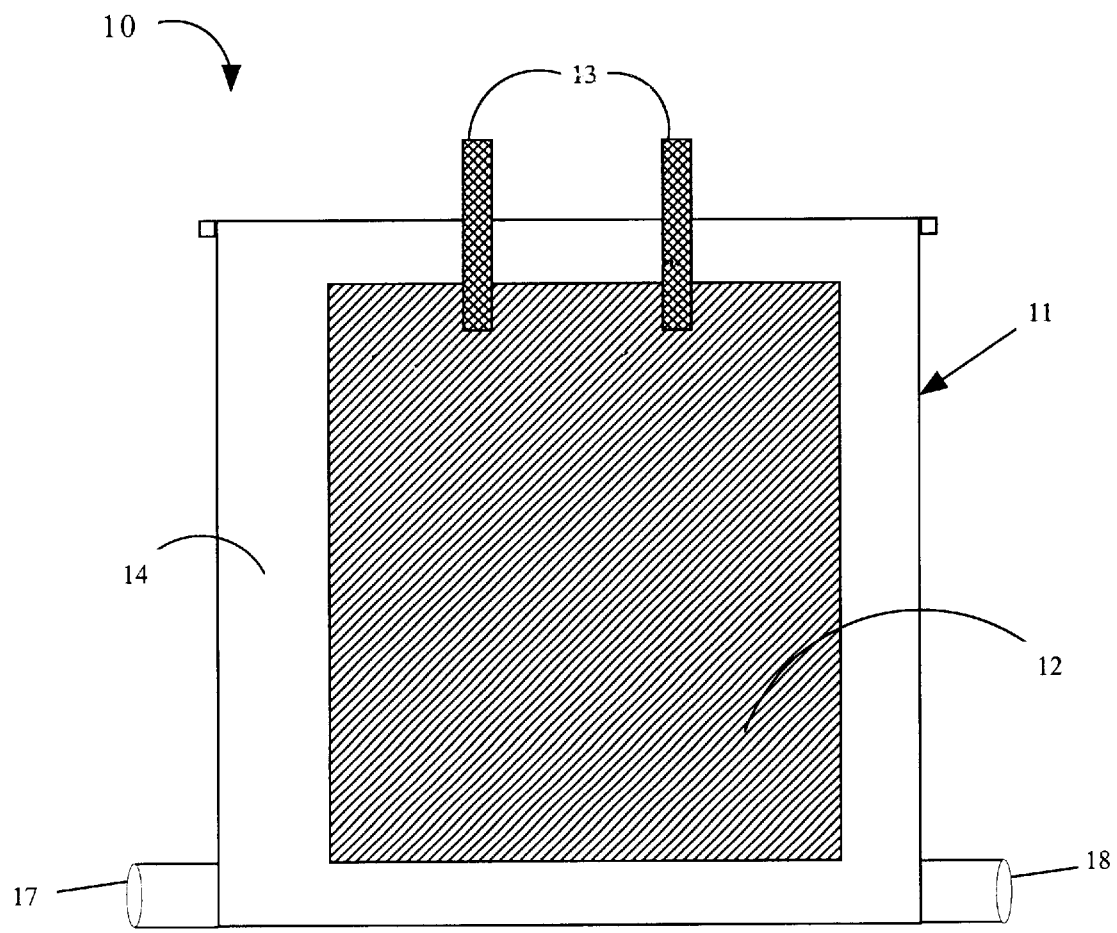
FIG. 1 illustrates a thermal regulator including an oil cooler can and a carbon foam element inserted in the oil can, according to an embodiment of the invention.

Preferred heat exchange materials provide high thermal conductivity and high thermal diffusivity. Improved materials for this purpose have recently been discovered. For example, carbon foam materials have been shown to provide superior thermal transfer properties. Applicants and/or the assignee of the invention (or its predecessors in interest) have invented (or co-invented) processes for forming low density, high thermal conductivity carbon foam materials; e.g., U.S. Pat. No. 6,033,506 to Klett, U.S. Pat. No. 6,037,032 to Klett and Burchell; which are both incorporated herein by reference in their entirety.

As described in U.S. Pat. No. 6,033,506 to Klett, carbon foam may be formed from a pitch powder, pitch granules or pitch pellets. The foam is preferably prepared using a mesophase pitch material. The resulting carbon foam is machinable into a variety of shapes from carbon foam elements having standard shapes. Alternatively, carbon foam elements can be formed in molds having desired final shapes, thus avoiding the need to machine the carbon foam.

Pitch materials can be solvated if desired. A proper mold release agent or film can be applied to the sides of the mold to improve removal of the part. For example, boron nitride spray or a dry graphite lubricant may be used as a mold release agent.

The sample can then be placed in a volume evacuated to less than approximately 1 torr and then heated to a temperature of approximately 120° C. and held overnight. The vacuum is released to an inert gas blanket. A pressure of up to 1500 psi is then applied. The temperature of the system is then raised to 600° C., or a temperature sufficient to coke the pitch being from approximately 500° C. to 1000° C. This heating/pressurizing step is performed using a temperature ramp rate of generally no greater than approximately 5° C./min and preferably at about 0.5–2° C./min. The temperature is held at the high temperature set point (e.g. 600° C.) for at least 15 minutes to achieve an assured soak. The furnace power is then turned off and cooled to room temperature.

Preferably, the foam is cooled at a rate of approximately 1.5° C./min with release of pressure at a rate of approximately 2 psi/min. During the cooling cycle, pressure is released gradually to atmospheric conditions. The foam can then be heat treated to approximately 1050° C. (carbonized) under an inert gas blanket and then preferably heat treated to at least approximately 2500° C. to 2800° C. in argon or other non-oxidizing ambient to graphitize the carbon foam. Graphitized foam is characterized by a highly aligned graphitic crystal structure.

Because of its highly graphitic foam structure, graphite foam provides high thermal conductivity in addition to the high degree of open porosity characteristic of carbon foam in general. As used herein, the term "thermally conductive" refers to materials which provide a thermal conductivity of at least 10 W/m·K, and preferably at least 20 W/m·K. Thermally conductive materials may be contrasted with thermally insulating materials, which are defined herein as having a thermal conductivity of no greater than about 2 W/m·K.

Whether carbon foam or graphite foam is formed, the foam structure is generally characterized as being open cellular, meaning that the porosity is not closed. Porosity tests have indicated that the pore sizes are generally in the range of approximately 50–300 $\mu$m. The open porosity yields a relatively large specific surface area (>20 m$^2$/g), which improves heat transfer.

The structure of graphite foam which can be produced from the above described method can be analyzed and characterized using techniques such as photomicrography, scanning electron microscopy (SEM), X-ray analysis and mercury porisimetry. Interference patterns under cross-polarized light can be used to demonstrate that the struts of the carbon foam formed are almost completely graphitic. That is, substantially all of the pitch is converted to graphite, the graphite crystals being aligned along the axis of the struts. These struts are also similar in size and are interconnected throughout the foam. This indicates that the foam also provides high stiffness and good strength.

Typical material properties of graphite foam derived from mesophase pitch are shown below:

| | |
|---|---|
| Density | 0.2–0.6 g/cm³ |
| Interlayer Spacing ($d_{002}$) | 0.336 nm |
| Stacking Height ($L_c$, 1010) | 80 nm |
| Coherence Length ($L_a$, 002) | 20 nm |
| Thermal Conductivity | 50 to over 200 W/m · K |
| Specific Conductivity | 258 (copper = 45) |
| Compressive Strength | 3.4 MPa |
| Compressive Modulus | 144 MPa |
| Specific Surface Area | 4–34 m²/g |

As shown above, graphite foam formed from mesophase pitch can provide thermal conductivities as high as about 200 W/m·K, while having densities of only approximately 0.55 g/cc. Several samples have demonstrated thermal conductivities in excess of 200 W/m·K. Thus, due to the low graphitic foam density, the specific thermal conductivity of graphitic foam is over 5 times that of copper and over 4 times that of aluminum.

Although mesophase pitch starting material is generally preferred to practice the invention, the invention can use any suitable pitch material, such as isotropic pitch. The pitch can be synthetic, petroleum, coal-tar based, or a blend thereof.

The high thermal conductivity and high degree of open porosity provided by graphite foam allows this material to function as an extremely efficient and lightweight porous thermal transfer media. Although carbon foam which has not been graphitized can also provide a high degree of open porosity, the lack of graphitic structure generally limits its thermal conductivity. Thus, for temperature regulation applications requiring heat exchange, such as for reducing fluid temperature, graphite foam is preferred over non-graphitized carbon foam.

The inventors have found that both carbon foam and graphite foam are non-electrically insulating materials, both providing high electrical resistivity. The range of the room temperature electrical resistivity for currently available carbon foam is from about 5.5 to 120 μohm·meter. The average in the z direction is about 6 μohm·meter, while the average in the x and y directions is approximately 85–90 μohm·meter for the foam. However, the electrical resistivity of non-commercially available (e.g. laboratory prepared) carbon foam is not limited to this range, since processing parameters can be adjusted to affect a wider electrical resistivity range.

High electrical resistivity permits the use of both carbon and graphite foam as heating elements. Thus, when a given application only requires heating, either carbon foam or graphite foam can be used effectively, while in applications requiring both heating and heat exchanging, graphite foam is preferably used.

Carbon foam elements can be used to thermally manage fluids. For example, such fluids can include engine oil and other engine fluids, including either liquids or gases. The phrase "other engine fluids," as used herein, refers to fluids including, but not limited to, ethylene glycol, brake fluid, transmission fluid and power steering fluid. In one embodiment of the invention, a carbon foam element is inserted in an engine oil cooler element, both of which can be provided in any desired size and shape. Since heat transfer is known to be effected by geometry, certain non-uniform carbon foam shapes can be used to improve heat transfer dynamics, such as thermal pumping power.

The invention can be used with any internal combustion engine to heat the engine or the oil when the engine is cold, such as at startup. In a preferred embodiment of the invention, the foam element also performs a heat exchange function by dissipating heat when the engine is hot.

Although carbon foam is used as a resistive element for heating fluids in the preferred embodiment of the invention, additional or alternative heat sources can also be provided to heat the carbon foam. For example, heat can be supplied by any suitable device, such as a thermoelectric or thermoionic device, which each can be powered by a battery. Thermoionic heating and refrigeration is described by G. D. Manhan and L. M. Woods, "Multilayer Thermionic Refrigeration," in Physical Review Letters, Vol. 80, Number 18 4016–4019 (The American Physical Society 1998) and is incorporated herein by reference. Thermoelectric and thermoionic devices can also provide fluid cooling through simply reversing the polarity of the applied bias voltage.

At startup, pre-heating of oil or other fluids to a desired temperature permits emission levels and engine wear to be significantly reduced. Oil temperature may also be regulated during steady-state operation via passive use of the graphite foam as a heat exchanger. As used herein, passive means without the assistance of a forced fluid flow.

The foam elements can be easily retrofitted into existing equipment, such as oil coolers, or can be used as stand alone units inserted into one or more fluid paths. Foam elements can be disposable, such as during an oil change, or designed to provide more long term service.

Due to its high electrical resistivity, when a carbon foam element is submersed in a solution, the solution may be resistively heated via an electrical circuit which dissipates heat across the carbon foam element. The heated carbon foam efficiently transfers heat into the solution in part, due to its high porosity. Upon attainment of a predetermined engine temperature, such as after an appropriate warm-up period after start-up, the oil heating process can be terminated. Any suitable temperature sensor, preferably interfaced with a feedback and control system can be used for this purpose.

The submersed carbon foam element can also preferably be used to cool the engine oil once the engine has reached a steady state temperature, or some maximum predetermined temperature. Portions of the carbon foam element extending beyond the submersed portion, such as outside an oil cooler, can be used to provide active or passive cooling to the fluid. Any suitable active cooling arrangement whereby the carbon foam acts as the thermal transfer medium is possible. The shape of the portion will generally be dependent on the desired functionality. Aerodynamics and heat transfer will generally be factors to be balanced.

For example, in an active cooling embodiment, a heat exchanger can be embodied as a shell-and-tube design with the shell side filled with the carbon foam. In this configuration, the heat transferred from (or to) the shell side fluid would be through the carbon foam.

Alternatively, or in addition, another heat exchange element, such as such a graphite foam element, can be inserted into the engine block and have a portion extending outside the block to provide either active or passive cooling. Cooling permits lower peak engine and steady-state lubricating oil temperatures which are known to enhance the performance and longevity of the oil, the various engine components, and the engine as a whole.

In one invention embodiment shown in FIG. 1, a thermal regulator 10 can include an existing oil cooler can 11 with one or more carbon or graphite foam "finger" elements. The foam element 12 may be a drop-in design with electrical leads 13 penetrating into the cooler 11, such as through the top of the lid to electrically contact foam element 12. Upon application of a suitable voltage bias across the foam element 12, electrical current induced generates ohmic heating. In one embodiment, the foam element 12 has contact vias (not shown) to permit insertion of electrical leads 13. Vias may be formed in the foam element 12 using a suitable mold or any other suitable technique, such as machining.

To provide improved electrical contact, an electrically conductive contact material may be applied to regions of the foam 12 which are used to provide contact to electrical leads 13. For example, the foam can be coated by electrically conductive materials using electroplating, electroless plating (e.g. nickel plating), flash coating or other similar processes. Brazing pads, electrically conductive adhesive/paints coatings can also be applied to the foam so that desired elements can be joined directly to the foam.

The carbon foam may be immersed in oil or other engine fluid coolant 14, such as ethylene glycol. Oil cooler can 11 includes inlet 17 and outlet 18. An optional filter (not shown) may be integral or disposed apart from the thermal regulator 10. It is possible to design foam elements generally though manipulating foam pore size so that liquids, such as oil, can be forced through the foam element so that both heating and filtration can be performed simultaneously.

Figure 2:
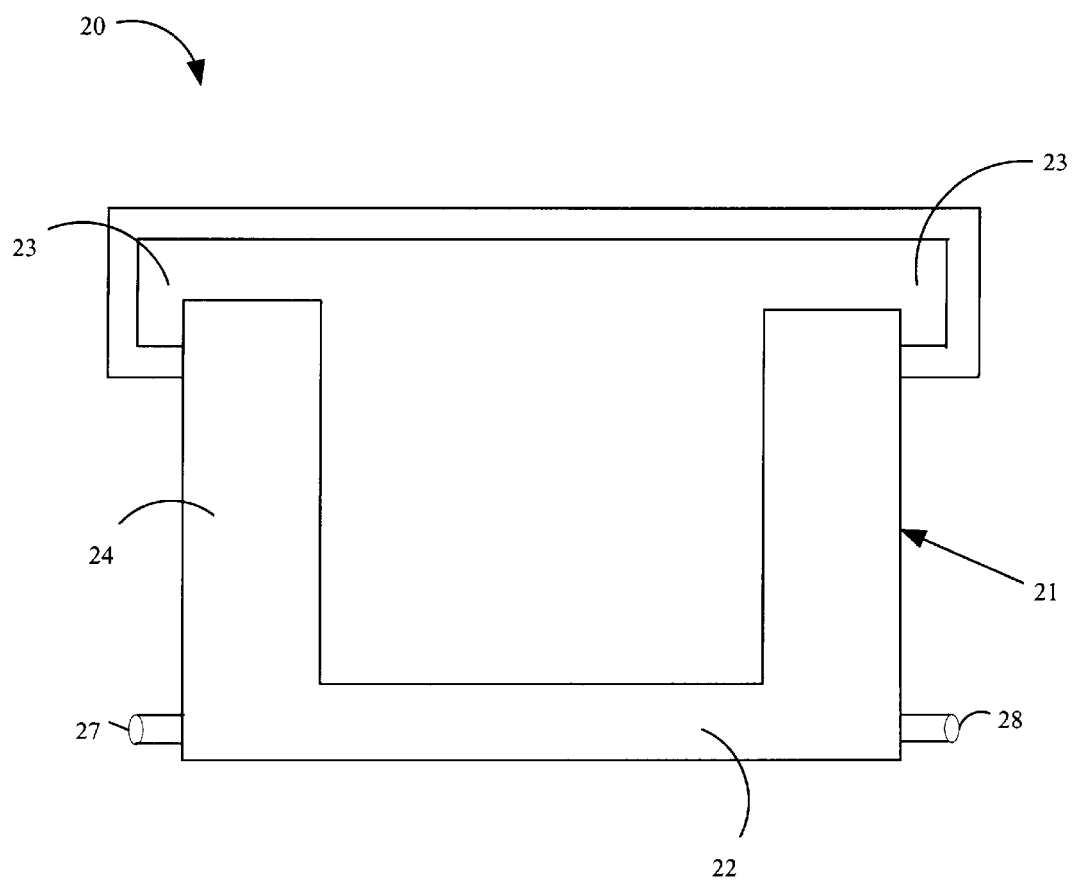
FIG. 2 illustrates a thermal regulator including an oil cooler can and a flanged element of carbon foam inserted in the oil can, according to another embodiment of the invention.

An alternative thermal regulator design 20 shown in FIG. 2 comprises an existing oil cooler can 21 and a flanged carbon or graphite foam element 22. The foam element 22 may be a drop-in design with electrical leads 23 penetrating the lid of the cooler and disposed in the flanged ends of foam element 22, to provide electrical current and resulting ohmic heating. The foam element 22 may be immersed in oil or other engine fluid 24. Oil cooler can 21 includes inlet 27 and outlet 28. An optional filter (not shown) may also be integral or disposed apart from this system.

The above thermal regulators 10 and 20 may each be disposable. For example, thermal regulators 10 and 20 can be discarded with each oil change or at some other interval.

In another embodiment of the invention, carbon foam can be used to provide direct temperature regulation, providing direct heating or cooling to the engine block. In the case of cooling, carbon foam elements can be inserted into one or more engine block locations for passive direct engine cooling, such as heat spreading. Alternatively, carbon foam elements inserted into the engine can be a component of an active heat exchanger, such as a built-in block heater. In any of these direct cooling embodiments, carbon foam elements can generally be used over an extended period of time, such as the life of the engine. The working fluid for active cooling can be pure or mixed liquids, or pure or mixed gases (e.g. air).

Inserted carbon foam elements in the engine block can be used in conjunction with an oil cooler, such as an oil cooler equipped with a carbon foam element as described above. However, use of carbon foam elements inserted into the engine block can eliminate the need for a separate oil cooler.

Preferably, carbon foam elements for direct heating and cooling are placed in known engine hot spots, such as to further reduce wear and increase the life of the engine. Foam elements can be placed to limit the considerable heat build up which is known to occur around edges of the exhaust valves. Foam elements can also be incorporated in devices in between siamese cylinder bores, where there is effectively no cooling. This can reduce cylinder distortion, thus increasing engine life. Carbon foam elements can also be use to cool torque converters and for windage trays, where the foam can help cool the oil as it drips down into the oil pan.

As a further example, engines are generally equipped with a cast iron cylinder head covering all cylinders. The holes for the injectors are made in the cast material. This generally leads to poor cooling of the injectors, partly because of the low thermal conductivity of the cast iron, and partly because the wall thickness is typically large. Carbon foam elements placed near the injectors and extending outside the engine block can reduce the operating temperature at these locations, preferably through use of a suitable active cooling system thermally connected to the carbon foam elements.

Heat spreading applications for the invention extend beyond the engine, such as for cooling the engine block as described above. The invention be used generally as a temperature equalizer, such as a heat spreader for passive temperature control applications such as in medical applications and food processing.

The invention can be used with a wide range of products. For example, the invention can be used with class 7–8 trucks, off-road heavy equipment, passenger vehicles and large stationary motors, such as those used to power conventional mining equipment. The invention is also useful for transformer oil, compressors for gas lines, refrigeration compressors.

The fluid temperature controlled by the carbon foam may contain other states of matter. For example, even with filtration, particulates may accompany most engine coolants. The invention can also be applied to temperature control other states of matter, such as those present during processes such as injection molding, pulling of fibers, or other processes where materials are processed in a semi-solid state.

A method for controlling the temperature of fluids includes the steps of providing at least one carbon foam element, the foam element thermally connected to a fluid. The foam can provide either active or passive cooling or heating. The carbon foam element can be electrically conductive. In this embodiment, the fluid can be heated by dissipating electrical current across the foam element.

In an engine application, the carbon foam can provide both heating and cooling. For example, engine fluids can be heated by dissipating electrical current across the electrically conductive carbon foam element when the engine is at a temperature below a predetermined minimum operating temperature. The foam can also provide cooling of the engine fluid if the engine temperature is at or above a maximum operating temperature. Cooling can comprise passively or actively radiating heat through a thermally conductive carbon foam element.

The method can include the step of controlling the viscosity of the fluid. The viscosity of engine coolants are known to be critical to the efficiency and life of the engine. In addition, viscosity control could be used to enhance certain processes, such as extrusion.

EXAMPLES

Tests were conducted on three different types of carbon foam materials, graphitized/oxidized, graphitized/non-oxidized, and non-graphitized/non-oxidized carbon foam. GM Goodwrench™ 5/W30 oil, produced by General Motors, Corp. was placed on each of the foam samples to determine if the oil wetted the foam. In each case, the foam was wetted.

The samples were then submersed in 250 ml of oil in a 1L beaker. Electrical leads were inserted into the foam. A 3 volt DC bias was applied across the foam resulting in a 10 ampere DC current. Temperatures of the foam and the oil were monitored.

The average temperature of the three (3) carbon foam samples and the oil at the beginning of each test was 22° C. The first oil temperature measurement was taken after approximately 15 minutes. After 15 minutes, the average carbon foam temperature was 62° C., and the oil temperature more than doubled to 45° C. At 30 minutes, the average carbon foam temperature was 75° C., and oil temperature rose to 57° C. It is noted that test conditions were not optimized since significant surface thermal conduction likely occurred. Accordingly, an optimized test configuration would have likely yielded improved results.

While the preferred embodiments of the invention have been illustrated and described, it will be clear that the invention is not so limited. Numerous modifications, changes, variations, substitutions and equivalents will occur to those skilled in the art without departing from the spirit and scope of the present invention as described in the claims.

We claim:

1. A combustion engine, comprising:
    an engine block, and
    at least one carbon foam element, said foam element extending into said engine block, wherein said foam element is disposed in thermal contact with at least one engine fluid.
2. The combustion engine of claim 1, wherein said carbon foam element includes at least two locations having structure for receiving electrical connectors thereto.
3. The combustion engine of claim 1, wherein said carbon foam element provides passive cooling.
4. The combustion engine of claim 1, further comprising an active cooling device, wherein said carbon foam element is thermally connected to said active cooling device.
5. The combustion engine of claim 4, wherein said cooling device comprises a heat exchanger having a shell side and a tube side, wherein said shell side comprises said carbon foam element.
6. The combustion engine of claim 1, wherein said carbon foam element comprises graphite foam.
7. The combustion engine of claim 6, wherein said graphite foam has a thermal conductivity of at least 50 W/m·K.
8. The combustion engine of claim 6, wherein said carbon foam element includes at least two locations having structure for receiving electrical connectors thereto.
9. The combustion engine of claim 8, wherein said carbon foam element is disposed in an oil container.
10. The combustion engine of claim 8, further comprising a thermostat for triggering heating of said foam element when said engine is at a temperature below a predetermined minimum operating temperature and for terminating said heating when a temperature of said engine is at or above a predetermined maximum temperature.
11. A temperature regulator, comprising:
    at least one carbon foam element, said foam element for electrically heating engine fluids, and
    at least two locations on said carbon foam element having structure for receiving electrical connectors thereto, wherein at a portion of said foam element is in physical contact with at least one engine fluid.
12. The temperature regulator of claim 11, wherein said engine fluid is selected from the group consisting of oil, ethylene glycol, brake fluid, transmission fluid and power steering fluid.
13. The temperature regulator of claim 11, wherein said carbon foam element comprises at least a portion which is thermally conductive.
14. The temperature regulator of claim 13, wherein said carbon foam element is thermally connected to an active cooling device.
15. The temperature regulator of claim 14, wherein said active cooling device comprises a heat exchanger having a shell side and a tube side, wherein said shell side comprises said carbon foam element.
16. The temperature regulator of claim 11, wherein said carbon foam element comprises graphite foam.
17. The temperature regulator of claim 16, wherein said graphite foam has a thermal conductivity of at least 50 W/m·K.
18. The temperature regulator of claim 11, wherein said carbon foam element provides electrical resistivity of between 1 to 500 $\mu$ohm·meter at 25° C.
19. The temperature regulator of claim 11, wherein said carbon foam element is disposed in an oil container.
20. The temperature regulator of claim 11, wherein said carbon foam element is flanged.
21. The temperature regulator of claim 11, further comprising a thermostat for triggering heating of said carbon foam element when a temperature is below a predetermined minimum temperature and for terminating said heating when a temperature is at or above a predetermined maximum temperature.
22. A method for controlling the temperature of engine fluids, comprising the steps of:
    providing at least one electrically conductive carbon foam element, said electrically conductive foam element in physical contact with at least one engine fluid, and
    heating said engine fluid by dissipating electrical current across said electrically conductive foam element.
23. The method of claim 22, wherein said heating is initiated when said engine fluid is at a temperature below a first predetermined temperature.
24. The method of claim 22, further comprising the step terminating said heating when said engine fluid is at a temperature above a predetermined maximum temperature.
25. The method of claim 22, further comprising the step of cooling said engine fluid after said fluid reaches a predetermined cooling temperature.
26. The method of claim 25, wherein said cooling comprises passively radiating heat through said electrically conductive foam element.
27. The method of claim 26, wherein said electrically conductive foam element comprises graphite foam.
28. The method of claim 22, wherein said engine fluid includes other states of matter.
29. The method of claim 22, further comprising the step of controlling a viscosity of said engine fluid.
30. The method of claim 22, wherein said engine fluid is selected from the group consisting of oil, ethylene glycol, brake fluid, transmission fluid and power steering fluid.
31. The method of claim 25, wherein said cooling is provided by an active cooling device, wherein said electrically conductive foam element is thermally connected to said active cooling device.
32. The method of claim 31, wherein said active cooling device comprises a heat exchanger having a shell side and a tube side, wherein said shell side comprises said electrically conductive foam element.
33. The method of claim 22, wherein said electrically conductive foam element comprises graphite foam.
34. The method of claim 33, wherein said graphite foam has a thermal conductivity of at least 50 W/m·K.
35. The method of claim 22, wherein said electrically conductive carbon foam provides electrical resistivity of between 1 to 500 $\mu$ohm·meter at 25° C.

36. The method of claim 22, wherein said electrically conductive foam element is disposed in an oil container.

37. The method of claim 22, wherein said electrically conductive foam element is flanged.

38. The method of claim 22, wherein said engine fluid is an engine coolant which circulates within an engine including an engine block, further comprising the step of directly cooling said engine block.

39. The method of claim 38, wherein a thermally conductive carbon foam element extends into said engine block.

40. A temperature regulation system, comprising:
a temperature regulator including at least one electrically conductive carbon foam element, said electrically conductive foam element for electrically heating engine fluids, and
structure for applying a potential difference across said electrically conductive carbon foam element, wherein at a portion of said foam element is in physical contact with at least one engine fluid.

41. The system of claim 40, wherein said engine fluid is adapted to heat at least one fluid selected from the group consisting of oil, ethylene glycol, brake fluid, transmission fluid and power steering fluid.

42. The system of claim 41, wherein said electrically conductive carbon foam element is adapted to provide cooling to at least one said engine fluid.

43. The system of claim 42, wherein said cooling comprises passive cooling.

44. The system of claim 40, further comprising an active cooling device, wherein said electrically conductive carbon foam element is thermally connected to said active cooling device.

45. The system of claim 44, wherein said active cooling device comprises a heat exchanger having a shell side and a tube side, wherein said shell side comprises said electrically conductive carbon foam element.

46. The system of claim 40, wherein said electrically conductive carbon foam element comprises graphite foam.

47. The system of claim 40, further comprising an oil container, wherein said electrically conductive foam element is disposed in said oil container.

48. The system of claim 40, wherein said electrically conductive carbon foam element is flanged.

49. The system of claim 40, further comprising a thermostat for triggering heating of said electrically conductive carbon foam element when a temperature is below a predetermined minimum temperature and for terminating said heating when a temperature is at or above a predetermined maximum temperature.

50. The system of claim 40, wherein said engine fluid is an engine coolant which circulates within an engine including an engine block, further comprising at least one thermally conductive carbon foam element, said thermally conductive foam element extending into said engine block.

51. The system of claim 50, wherein said thermally conductive carbon foam element comprises graphite foam.

52. The system of claim 51, wherein said graphite foam has a thermal conductivity of at least 50 W/m·K.

53. A method for operating a combustion engine, comprising the steps of:

providing at least one electrically conductive carbon foam element, said foam element thermally connected to an engine fluid; and
at least one of:
heating said engine by dissipating electrical current across said electrically conductive carbon foam element when said engine is at a temperature below a predetermined minimum operating temperature and cooling said engine if said engine temperature is at or above a maximum operating temperature, wherein said cooling comprises radiating heat through a thermally conductive carbon foam element.

54. The method of claim 53, wherein said heating is terminated when said engine fluid heating step results in said temperature being above a predetermined shutoff temperature.

55. The method of claim 53, wherein said cooling comprises passively radiating heat through said thermally conductive carbon foam element.

56. The method of claim 53, wherein said electrically conductive carbon foam element is said thermally conductive carbon foam element.

57. The method of claim 53, wherein said thermally conductive carbon foam element extends into said engine block.

58. The method of claim 53, wherein at least one of said electrically conductive and thermally conductive carbon foam elements comprise graphite foam.

59. The method of claim 58, wherein said graphite foam has a thermal conductivity of at least 50 W/m·K.

60. The method of claim 53, wherein said engine fluid is selected from the group consisting of oil, ethylene glycol, brake fluid, transmission fluid and power steering fluid.

61. The method of claim 60, wherein said cooling is provided by an active cooling device, wherein said thermally conductive foam element is thermally connected to said active cooling device.

62. The method of claim 61, wherein said active cooling device comprises a heat exchanger having a shell side and a tube side, wherein said shell side comprises said thermally conductive carbon foam element.

63. The method of claim 53, wherein said electrically conductive carbon foam element is disposed in an oil container.

64. The method of claim 53, wherein said electrically conductive foam element is flanged.

65. A heat spreader, comprising:
at least one thermally conductive carbon foam element, said carbon foam element in physical contact with an engine fluid to be cooled, said foam element drawing heat from said fluid and distributing said heat across its volume.

66. The heat spreader of claim 65, wherein said engine fluid is selected from the group consisting of oil, ethylene glycol, brake fluid, transmission fluid and power steering fluid.

* * * * *